June 19, 1951 — R. F. E. STEGEMAN — 2,557,321
SEMIRIMLESS SPECTACLE
Filed Oct. 27, 1948
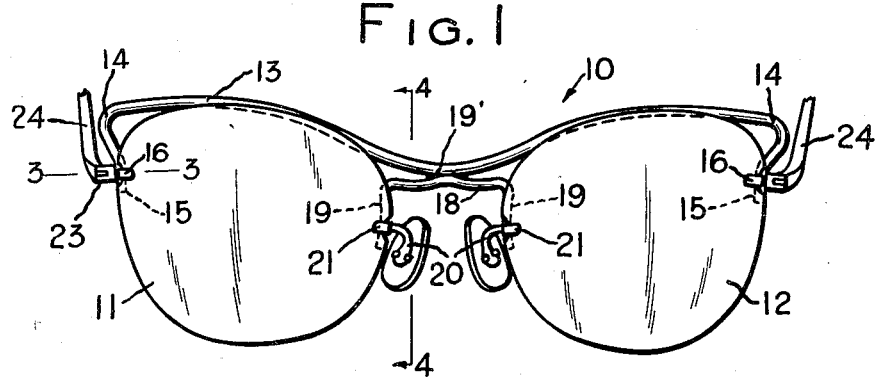
INVENTOR.
R.F.E. STEGEMAN Patented June 19, 1951

2,557,321

UNITED STATES PATENT OFFICE 2,557,321

SEMIRIMLESS SPECTACLE

Raymond F. E. Stegeman, Greece, N. Y., assignor to Bausch & Lomb Optical Company, Rochester, N. Y., a corporation of New York Application October 27, 1948, Serial No. 56,885

4 Claims. (Cl. 88—41)

This invention relates to spectacles and more particularly it has reference to spectacles of the semi-rimless type wherein a frame member is positioned rearwardly of the lenses and extends along their top and temporal edges.

In one such type of semi-rimless spectacles the lenses are secured to the frame member by means of screws which pass through holes formed in the lens and are threaded into lugs which are secured to the frame member and positioned against the rear surface of the lens. When attaching the lenses, it is, therefore, necessary that the holes in the lenses be accurately located and drilled. Otherwise, the frame member will be so positioned that it puts a strain upon the lens or presents an unsightly appearance. Furthermore, such frame members cannot readily be adjusted to accommodate lenses of various sizes and shapes.

One of the objects of this invention is to provide a semi-rimless spectacle having a construction which will eliminate the above mentioned difficulties. Another object is to provide a spectacle of the type described which embodies means whereby the frame member which carries the lens holding means may be adjusted relative to the lens. A further object is to provide in a spectacle of the type described an improved construction embodying a resilient frame member which functions to hold the lenses. Still another object is to provide such a spectacle mounting in which the bridge is suspended from a single frame member and the sides of the bridge carry lens holding means for engaging the nasal edges of the lenses. These and other objects and advantages reside in certain novel features of construction, arrangement and combination of parts as will hereinafter be more fully described and pointed out in the appended claims.

Referring to the drawings:

Fig. 1 is a front elevation of a semi-rimless spectacle embodying my invention.

Fig. 2 is a top plan view thereof.

Fig. 3 is an enlarged sectional view taken on line 3—3 of Fig. 1.

Fig. 4 is a view taken on line 4—4 of Fig. 1.

Fig. 5 is a fragmentary front elevation of the spectacle of Fig. 1 showing a modified type of lens holding device.

Fig. 6 is an enlarged sectional view taken on line 6—6 of Fig. 5.

Fig. 7 is a fragmentary view of another modification.

Fig. 8 is a fragmentary view of still another modification.

A preferred embodiment of my invention is shown in Figs. 1–4 of the drawing wherein 10 indicates, generally, a semi-rimless spectacle comprising the spaced lenses 11 and 12 and the frame member 13 which is positioned rearwardly of the lenses. The frame member 13 comprises a single, integral resilient member which extends between the lenses and outwardly beyond the respective temporal edges of the lenses and thence downwardly and inwardly to the rear surfaces of the lenses and adjacent the temporal edges thereof. This structure of the frame member provides the loops 14 which enable the optician to adjust the frame member 13 relative to the lenses 11 and 12 and thereby compensate for any inaccuracies in the location of the holes or notches which are formed in the lenses for cooperation with the lens holding means on the frame member.

Adjacent its respective ends 15, the frame member 13 carries the forwardly projecting brackets or fingers 16 which are engaged in notches 17 formed in the temporal edges of the lenses. Positioned between the lenses is a bridge having a substantially horizontal portion 18 which is secured as by solder 19' at its mid-portion to the underside of frame member 13. Projecting downwardly from the bridge portion 18 are the two relatively rigid sides 19 which carry, adjacent their extremities, the nose pad arms 20 and the forwardly projecting brackets or fingers 21 which engage notches 22 formed in the nasal edges of the lenses. Endpieces 23 secured to the temporal portions of the frame member 13 pivotally support the usual temples 24.

Since the frame member 13 is resilient, the respective halves of the member 13 may be flexed from substantially the soldered connection 19 so that the temporal portions will move away from the lenses and thereby disengage the fingers 16 from the notches 17 for detaching the lenses from the frame member. Since the bridge sides 19 are relatively rigid, the resilience of the frame member 13 not only holds the fingers 16 in engagement with the temporal notches 17 but also holds the notches 22 in engagement with the nasal fingers 21. Since the bridge portion 18 is secured to the frame member 13 at the central portion of the former, it is possible for the optician to raise or lower the sides 19 with pliers in order to properly locate the fingers 21 with respect to the notches 22 in order to compensate for any inaccuracies in locating the notches. The adjustment loops 14 not only permit the adjustment of the fingers 16 relative to notches 17, but also allow the optician to adjust the frame member 13 so as to properly follow the contour of the upper edges of the lenses and thereby accommodate lenses of different sizes and shapes.

In Figs. 5 and 6 there is shown the mounting of Figs. 1-4 with the modified lens holding devices comprising threaded lugs 16' which are attached, as by soldering, to the temporal portion of the frame member 13 and the sides 19 of the bridge so that they engage the rear surface of the lens. Screws 25, carrying washers 25', are passed through apertures 17' formed in the temporal and nasal portions of the lens and are threaded into the lugs 16'. In this form it is not essential that the frame member 13 be resilient since the lenses are held by screws rather than by the resilience of the frame member acting through the fingers 16.

In the modification shown in Fig. 7, the lenses 26 are detachably secured to the resilient frame member 27 by the fingers 28 and 29 which engage, respectively, notches formed in the temporal and nasal edges of the lens. The frame member is positioned rearwardly of the lenses and extends along the upper edges thereof and outwardly beyond the temporal edges of the lenses and thence downwardly to form the adjustment loops 30 and thence upwardly to a point adjacent the temporal edge of the lens. The forwardly extending finger or bracket 28 is secured to the end portion of frame member adjacent the extremity thereof. Positioned between the lenses is a bridge having a substantially horizontal portion 31 and the relatively rigid sides 32 to which are secured the nose pad arms 33 and the fingers or brackets 29 which engage notches formed on the nasal edges of the lenses. The bridge is secured to the under side of frame member 27 by soldering the portion 31 to the frame member at two spaced points 34 and 35. With such a soldered connection, it is still possible for the optician to raise or lower the sides 32 so as to properly locate the fingers 29 in the notches formed in the nasal edges of the lenses. The adjustment loop 30 also permits adjustment of the frame member 27 in order to properly locate the fingers 28 relative to the temporal notches in the lens or to position the frame member along the top edge of the lens to accommodate lenses having different shapes or sizes.

In Fig. 8 there is shown a further modification in which the lens 36 is attached to a frame member 37 which is positioned rearwardly of the lens and extends along the nasal and top edges of the lens and beyond the temporal edge and thence downwardly and inwardly to provide the adjustment loop 38. The nasal end of the frame member 37 is secured to the bridge 39 which carries the nose pad 40. The lens is detachably secured to the mounting by means of screws 41 which pass through apertures in the lens and are threaded into lugs 43 which engage the rear surface of the lens and are soldered to the respective temporal and nasal portions of the frame member 37. The usual endpieces 44 are secured to the temporal portions of the frame member 37 for the purpose of attaching the temples. In this form of the invention, it is not necessary that the frame member 37 be resilient since the lenses are not held on the mounting by the resilience of the frame member but rather by means of screws 41, as in the structure of Figs. 5-6. The loop 38 enables the optician to adjust the frame member 37 so as to compensate for any inaccuracy in drilling the holes in the lenses and it also permits the forming of the frame member 37 so as to accommodate lenses of different sizes and shapes.

From the foregoing it will be apparent that I am able to attain the objects of my invention and provide an improved type of semi-rimless mounting in which the frame member is positioned rearwardly of the lenses and extends along the top edges thereof. The adjustment loops which are formed by extending the frame members beyond the temporal edges of the lenses enable the optician to not only adjust the positions of the lens attaching means relatively to the notches or holes in the lenses but also allow him to adjust and form the frame members so that they may be fitted to lenses of different sizes and shapes. Hence, a single frame member may be used with different shaped and sized lenses so that the stock of mountings which the optician must maintain is reduced to a minimum.

The mounting of Fig. 8 may, of course, be provided with the lens notches and resiliently held fingers instead of the screws and threaded lugs for holding the lenses. The bridge portion 18 could be attached to the frame member 13 by soldering at two spaced points as shown in Fig. 7. Since the soldered connections are spaced inwardly from the ends of the horizontal bridge portions 18 and 31, it is possible to adjust the sides of the bridges, such as by raising or lowering, so that the lens holding means, such as 21 or 16', may be positioned in alignment with the notches or apertures which are formed in the lenses for cooperation with the holding means.

In the mountings shown in Figs. 1-4 and 7, the frame member is a single integral resilient member which flexes adjacent its connection with the bridge so that the temporal ends of the frame member may be moved toward or from the lenses in order to remove or insert the lenses. Since the sides of the bridge member are relatively rigid they do not flex but merely serve to hold the nasal fingers in the cooperating notches in the lenses. When the threaded lugs and screws are used in the mountings, as in Figs. 5 and 6, instead of the fingers or brackets which are resiliently held in the notches, the frame members need not necessarily be resilient, though they must be bendable in order that they may be adjusted as previously mentioned. When the sides of the bridge carry the threaded lugs, the former may be adjusted vertically and laterally so as to properly position the lugs in alignment with the apertures in the lenses. Although the frame members in Figs. 1-7 are shown as formed of a single member, they may, of course, be formed of two separate members which are attached to the bridge as by soldering. In the modification shown in Fig. 8, a separate frame member is positioned behind each lens and the members are connected by the bridge.

There has, therefore, been provided a semi-rimless spectacle mounting which embodies important structural features while still presenting a neat appearance. Various modifications may, obviously, be made without departing from the spirit of my invention.

I claim:

1. In a spectacle construction, the combination of a pair of spaced lenses, frame member means positioned rearwardly thereof and extending between and along the upper edges of the respective lenses and outwardly beyond the temporal edges thereof and thence downwardly and inwardly to the temporal edges of the lenses so as to form adjustment loops, a bridge positioned between the lenses and having a horizontal portion and sides extending downwardly from said portion along the nasal edges of the lenses, the bridge being secured to the frame member means only at said horizontal portion of the bridge whereby the sides of the bridge may be adjusted, the nasal and temporal portions of the lenses having parts thereof formed to coact with lens holding means, lens holding means secured to the respective temporal portions of the frame member means below the adjustment loops and to the sides of the bridge, said lens holding means being attached to the adjacent edges of the respective lenses by cooperation with said parts.

2. In a semi-rimless spectacle having a lens, a bridge attached to the nasal side of the lens, an integral frame member connected to the bridge, said member extending along the top edge of the lens and beyond the temporal edge thereof and thence downwardly and inwardly to form an adjustment loop which extends outwardly from the upper temporal edge of the lens, the temporal portion of the lens having a part thereof formed to coact with lens holding means, and lens holding means carried by the temporal portion of the frame member below said adjustment loop, said lens holding means being attached to the temporal portion of the lens by cooperation with said part, and a temple pivotally mounted on the frame member below said adjustment loop.

3. In a semi-rimless spectacle the combination of a lens, a bridge connected to the nasal side of the lens, an integral frame member positioned rearwardly of the lens and extending along the top edge thereof and beyond the temporal edge thereof and thence downwardly and inwardly to form an adjustment loop which extends outwardly from the upper temporal portion of the lens, said frame member being connected to the bridge, the temporal portion of the lens having a part thereof formed to coact with lens holding means, and lens holding means carried by the frame member below said adjustment loop, said lens holding means being removably attached to the temporal side of the lens through cooperation with said part, and a temple pivotally mounted on the frame member below said adjustment loop.

4. In a semi-rimless spectacle the combination of a lens, a bridge connected to the nasal side of the lens, an integral frame member positioned rearwardly of the lens and extending along the top edge thereof and beyond the temporal edge thereof and thence downwardly and inwardly to form an adjustment loop which extends outwardly from the upper temporal portion of the lens, said frame member being connected to the bridge, and lens holding means carried by the frame member below said adjustment loop, the temporal portion of the lens having a part thereof formed to coact with the lens holding means, said lens holding means being removably attached to the temporal side of the lens by cooperation with said part, and temple connections carried by the frame member below said adjustment loop.

RAYMOND F. E. STEGEMAN.

REFERENCES CITED

The following references are of record in the file of this patent:

UNITED STATES PATENTS

| Number | Name | Date |
|---|---|---|
| 2,069,347 | Williams | Feb. 2, 1937 |
| 2,176,590 | Kirk et al. | Oct. 17, 1939 |
| 2,236,304 | Snavely | Mar. 25, 1941 |
| 2,245,594 | Kimmel | June 17, 1941 |
| 2,246,507 | Cozzens | June 24, 1941 |
| 2,256,502 | Splaine | Sept. 23, 1941 |
| 2,257,811 | Pomeranz | Oct. 7, 1941 |
| 2,257,812 | Pomeranz | Oct. 7, 1941 |
| 2,277,118 | Leavitt | Mar. 24, 1942 |
| 2,383,572 | Splaine et al. | Aug. 28, 1945 |
| 2,384,815 | Cozzens | Sept. 18, 1945 |
| 2,439,357 | Bouchard | Apr. 6, 1948 |

FOREIGN PATENTS

| Number | Country | Date |
|---|---|---|
| 586,299 | Great Britain | Mar. 13, 1947 |